FACSIMILE SCANNER

Filed Oct. 8, 1959

2 Sheets-Sheet 1

*INVENTORS*
D. M. ZABRISKIE
A. HOFER
BY J. B. Burke
ATTORNEY

April 4, 1961 D. M. ZABRISKIE ET AL 2,978,288

FACSIMILE SCANNER

Filed Oct. 8, 1959

2 Sheets-Sheet 2

INVENTORS
D. M. ZABRISKIE
A. HOFER

BY J. B. Burke
ATTORNEY

United States Patent Office 2,978,288

Patented Apr. 4, 1961

2,978,288

FACSIMILE SCANNER

Douglas M. Zabriskie, Northvale, N.J., and Adolph Hofer, Hampton Bays, N.Y., assignors to The Western Union Telegraph Company, New York, N.Y., a corporation of New York Filed Oct. 8, 1959, Ser. No. 845,116

2 Claims. (Cl. 346—139)

The present invention relates to facsimile telegraphy and more particularly to improvements in belt type facsimile recorders. This application is a continuation-in-part of our copending application U.S. Serial No. 679,348, filed August 21, 1957, now abandoned.

The conventional belt type facsimile recorder in use at the present time provides a flexible belt to which a plurality of stylus holders are fastened. By means of a pair of pulleys, the belt is driven to cause the styluses to traverse the moving message paper. One type recorder employs a flexible belt having teeth along the inner surface thereof that cooperate with toothed pulleys. The belt is made of an organic material having metallic bands embedded therein to prevent longitudinal stretching. A recorder employing this type of belt is shown in U.S. Patent No. 2,770,517. In order to maintain the traveling belt in a fixed track to produce well defined message copy, a track having magnets embedded therein has been employed as described in U.S. Patent No. 2,766,097 to D. M. Zabriskie. Thus the stylus holders which are of magnetic material will be held down on the track to insure a consistent straight line recording path. With a plurality of magnets so embedded in the track, it has been found that an intermittent retarding force is produced on the belt. One reason for this is that the lines of flux set up by the series of magnets will not be of uniform density along the path of the stylus belt. As each stylus holder on the belt passes through these fields, the retarding force created thereby will vary depending upon the relative position of each ferrous stylus holder and flux field. The result of this intermittent magnetic force on the stylus belt results in distorted message copy.

It has been proposed in the above mentioned Patent 2,766,097 to space the belt from the track containing the magnets by means of nonmagnetic, nonconductive plastic blocks made of material such as nylon, in order to render the forces of magnetic attraction more uniform. The track includes metal rails supporting the nonmagnetic, nonconductive blocks. This construction has been found disadvantageous because the plastic blocks wear rapidly. Also no direct electrical path then exists between the stylus holders and the metal rails so that as an expedient supplementary electrode means must be introduced into the apparatus to serve as an electrical return path between the stylus and the source of marking current. This expedient introduces costly complexities in the recorder structure, increases maintenance time and expense, and is desirably to be avoided.

According to the present invention there is provided a flexible, nonconducting endless belt in a facsimile recorder. The belt carries electrically conductive magnetic stylus holders each carrying a stylus for marking a recording medium electrically. The stylus holders ride on electrically conductive magnetic metal rails while the belt is prevented from twisting and sliding laterally by guide pins carried by the belt and riding in a nonmagnetic channel between the rails. In order to prevent excessive wear which occurs when the stylus holders ride on the metal rails, there are provided sintered metal carbide inserts in the stylus holders and rails. These inserts are unusually hard, much harder than any known type of hardened metal. By use of such inserts as bearing elements, material wear is reduced to negligible amounts and the useful life of the stylus holders is prolonged manifold. These carbide inserts are placed in the rails and stylus holders so that they space the magnetic stylus holders slightly from the magnetic rails. Since the inserts are nonmagnetic or substantially nonmagnetic, they provide gaps in the magnetic paths between the rails and the stylus holders which serve to establish greater uniformity in the magnetic field in which the stylus holders ride. As a result, the pull on the stylus holders is constant as they ride along the rails. At the same time carbide inserts are conductive so that electrical continuity is maintained between the rails and the stylus holders without the necessity of providing supplementary complex electrical conducting devices between the stylus holders and outside circuits.

Accordingly, it is an object of the present invention to provide an improved type of facsimile recorder employing a flexible endless drive belt for stylus holders.

Another object is to provide a facsimile recorder wherein a flexible, endless, nonconducting belt carries a plurality of electrically conductive magnetic stylus holders riding on electrically conducting, magnetic rails, the sliding contact between the stylus holders and the rails being maintained continuously by magnetic means.

A further object is to provide a facsimile recorder of the character described, wherein sintered metal carbide elements are provided in the stylus holders and rails to provide long wearing, electrically conductive, nonmagnetic or substantially nonmagnetic bearing elements spacing the stylus holders from the rails in a magnetic circuit to maintain uniform sliding contact between the bearing elements and to maintain electrical continuity between the stylus holders and the rails.

Another object of the present invention is to provide a facsimile recorder employing a flexible belt of rubber-like material wherein the belt is maintained in a fixed designated track and lateral deformation and twisting is prevented.

In accordance with the above and other objects, the present invention provides parallel magnetic rails having nonmagnetic inserts extending throughout the effective lengths thereof. In addition, the bottom plate of each stylus holder which contacts the magnetic rails also has hard nonmagnetic inserts which contact and ride over the inserts in the rails. In this way the magnetic rails and magnetic stylus holders are separated by nonmagnetic material to eliminate or minimize the intermittent retarding force on the belt carrying the stylus holders. Experiments have found that by separating the magnetic materials by means of nonmagnetic inserts, the forward pull on the belt is consistent and the tendency toward poorly defined message copy produced by the prior art machines due to this cause is thereby eliminated. In addition, direct electrical continuity is maintained continuously between the rails and stylus holders. Furthermore, the present invention provides a slotted nonmagnetic track over which the stylus belt travels and which receives a pin depending from the lower plate of each stylus holder. This arrangement precludes any sidewise movement of the belt.

The present invention will be more fully understood from the following description of a specific embodiment thereof taken with the drawings, in which:

Fig. 3 is a sectional view taken on the line 3—3 of

Figures 1, 2:
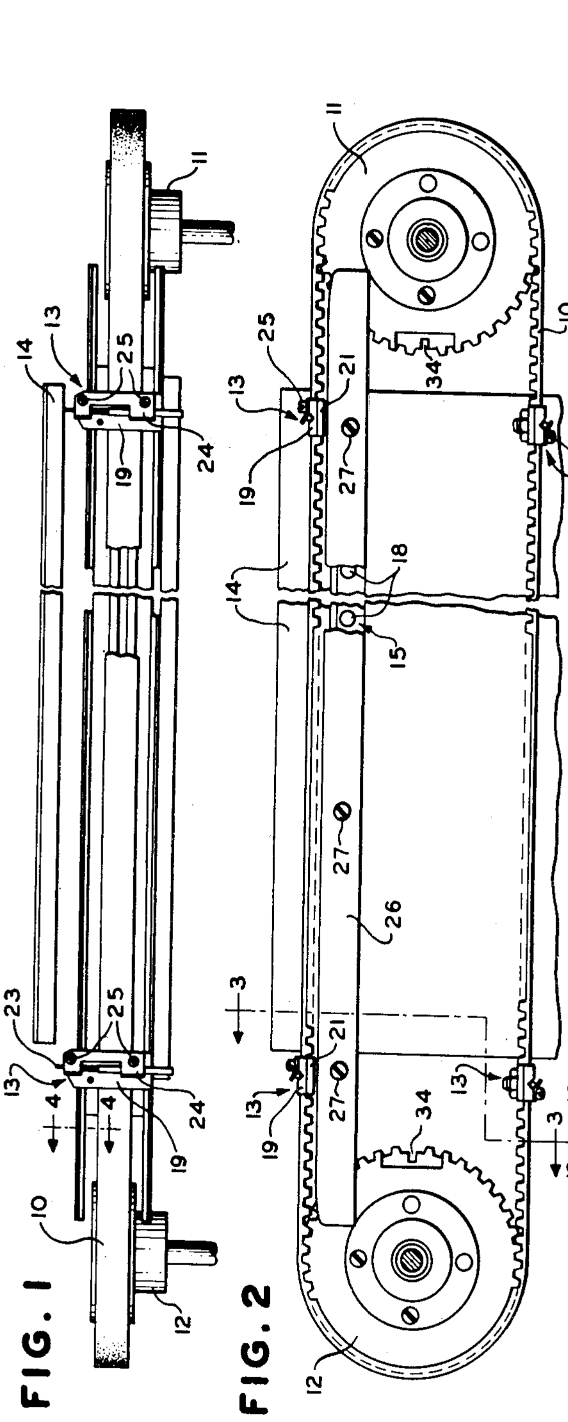
Fig. 1 is a plan view of the stylus belt mechanism of the present invention.
Fig. 2 is an elevation view of the mechanism of Fig. 1.
Figures 3, 4, 5, 6:
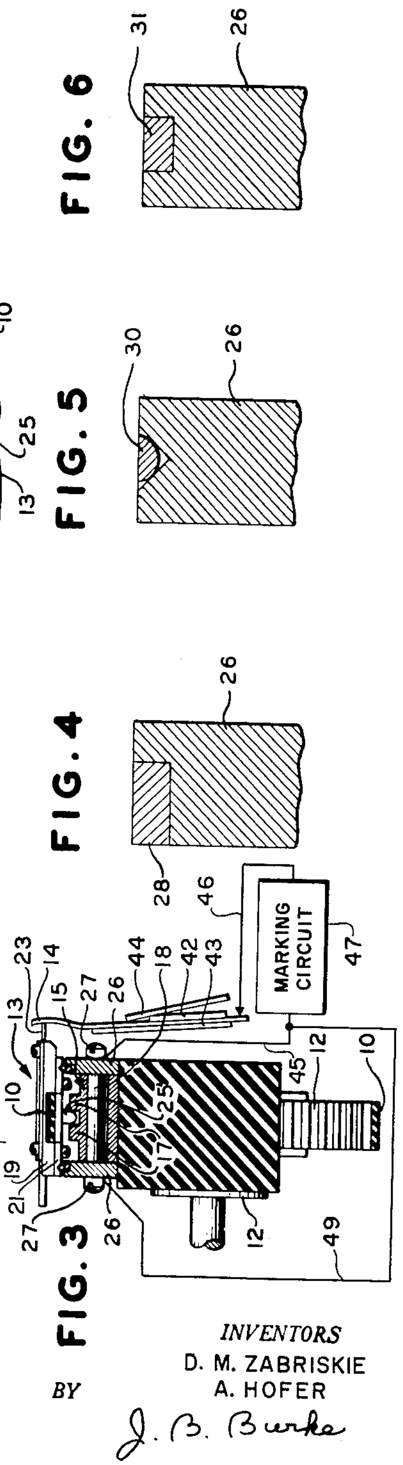
Figures 7, 8, 9, 10, 11:
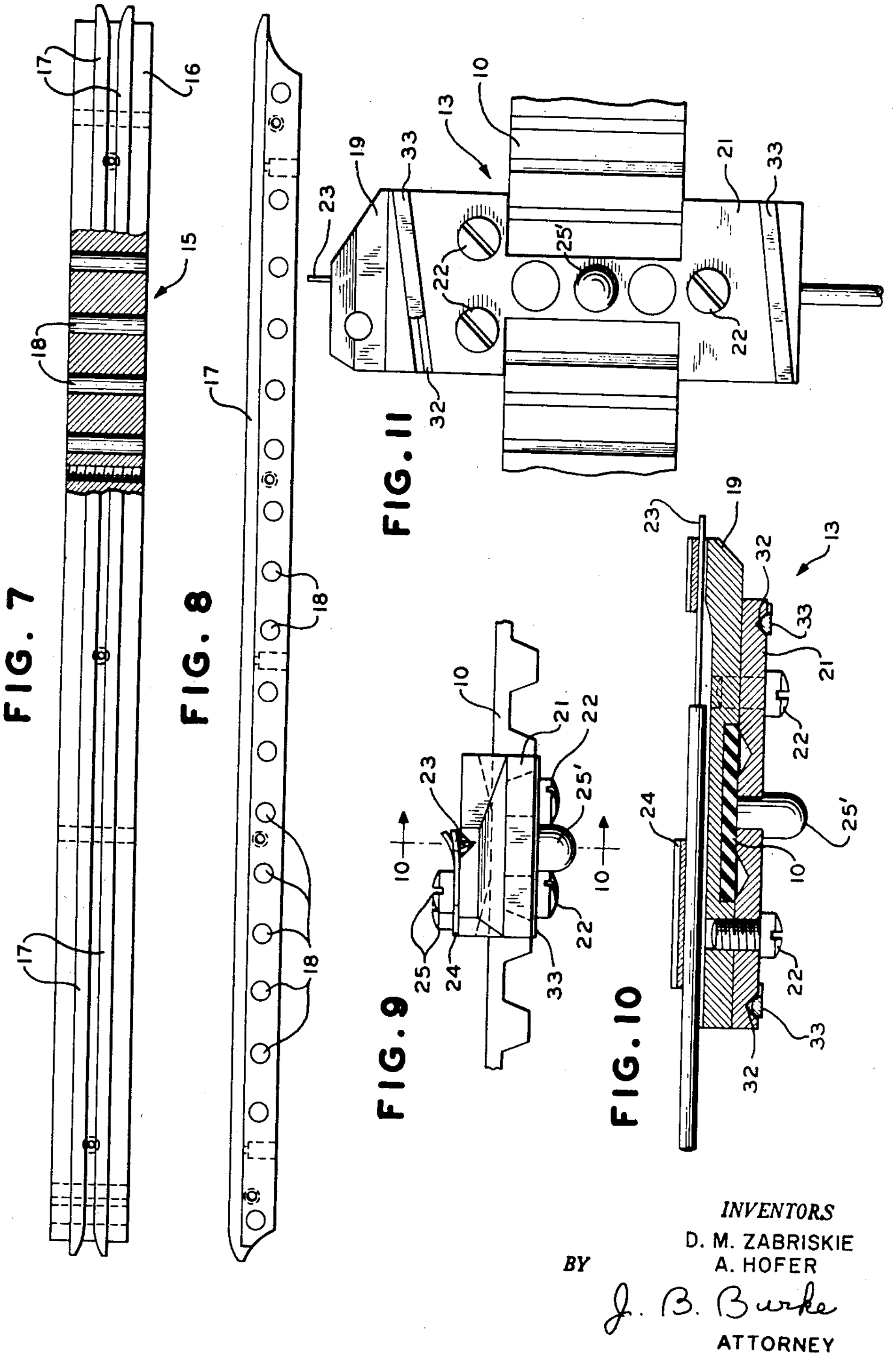

Fig. 2 with portions of an associated electrical circuit shown diagrammatically;

Fig. 4 is a sectional view of a grouping bar showing the position of the nonmagnetic insert therein;

Figs. 5 and 6 are modifications of the insert shown in Fig. 4;

Fig. 7 is a plan view partially broken away of the belt table of the present invention;

Fig. 8 is an elevation view of the belt table of Fig. 7;

Fig. 9 is a front view of the stylus holder and a portion of the stylus belt;

Fig. 10 is a sectional view taken on the line 10—10 of Fig. 9; and

Fig. 11 is a bottom view of the stylus holder and belt of Fig. 9.

Referring now to the drawings and more particularly to Figs. 1, 2 and 3, a belt 10 passes around a driving pulley 11 and idler pulley 12. A plurality of stylus holders generally indicated by numeral 13 are secured to the belt at fixed intervals along the length thereof and are drawn across the recording paper 14. For details of the complete recorder and receiving system, references may be had to U.S. Patents Nos. 2,739,029 and 2,783,-120. The belt 10 is of the general type disclosed in U.S. Patent No. 2,770,517 and is made of a rubber-like material having steel bands embedded therein to prevent stretching. A series of teeth are molded along the inner surface of the belt and cooperate with the notches or teeth in the peripheries of pulleys 11 and 12. In order to insure that the stylus holders traverse a fixed path, a guiding arrangement is provided which includes a belt table 15 shown in detail in Figs. 7 and 8. The table includes a base portion 16 and a pair of upstanding ribs 17 that define a channel which serves to guide the stylus holders as will become apparent hereinafter. In order to insure that the stylus holders will not leave the track due to centrifugal force, a series of magnets 18 are inserted in holes in the base portion 16 of belt table 15.

Referring now to Figs. 9, 10 and 11, the stylus holder 13 includes a stylus holder plate 19 and a stylus holder clamp 21 which are located on opposite sides of the stylus belt 10. Both plate 19 and clamp 21 are made of electrically conductive magnetic metals. The clamp 21 has three screws 22 passing upward therethrough that are received in tapped holes in stylus holder plate 19. In this manner the plate and stylus holder clamp are firmly secured in place on the belt 10. The upper surface of the stylus holder plate is notched to receive the electrically conductive stylus 23 which is held in place by a stylus clamp 24. The stylus clamp is secured in place by means of screws 25 which pass therethrough and are received in tapped holes in the stylus holder plate. A stud or pin 25' depends from the lower surface of the stylus holder clamp and has a diameter substantially equal to the distance between ribs 17 of the belt table.

As seen in Fig. 3, a pair of flat side rails or grouping bars 26 are located in place on either side of the belt table 15 by means of screws 27. The width of each grouping bar is such that it extends above the upper surface of ribs 17 so that the stylus holders will ride on the upper edges of the grouping bars. The depending pin 25' on each stylus holder will ride in the channel between ribs 17 to prevent sidewise displacement of the belt and stylus holders. The outer extremity of the underside of each stylus holder clamp 21 engages the upper surfaces of the grouping bars 26. Bars 26 are made of electrically conductive magnetic metal.

It is understood then that the stylus holders being of magnetic material are attracted downward against the upper edges of the grouping bars by the magnetic fields maintained by magnets 18.

In order to provide a sufficiently hard surface upon which the stylus holders ride and to separate the magnetic stylus holders from the magnetic grouping bars by nonmagnetic elements, a portion of the top edge of each grouping bar is cut away and a nonmagnetic or substantially nonmagnetic electrically conductive strip of hard material is inserted. This material is a sintered metal carbide, preferably sintered tungsten carbide bound in a metal matrix. This metal matrix may include cobalt, nickel, chromium, tantalum, vanadium, molybdenum, or other metals will contribute to the hardness and rigidity of the structure without impairing its electrical conductivity or rendering the structure magnetic to any material extent. The insert may be formed by well known metal carbide fabrication techniques and need not be described here. This material is employed in preference to hardened steel, bronze, and other metals, which are very short lived and useless for all practical purposes in the present apparatus.

As shown in Figs. 3 and 4, the upper inner edge of each grouping bar 26 has a rectangular cut-out portion the entire length thereof. A carbide rod or strip 28 is secured in place by silver solder or other means in each grouping bar and is even with the top surface of the respective bar. An alternative insert arrangement is shown in Fig. 5 where a V-notch is cut in the top surface of the grouping bar throughout the entire length thereof. A carbide rod 30 or strip is secured in place within the V-notch by means of silver soldering and is level with the top of the grouping bar. Another alternative arrangement is to cut out a rectangular groove or slot as shown in Fig. 6 and insert a rectangular insert rod 31. In all of these arrangements it should be noted that the insert is made of sintered metal carbide as above mentioned.

The bottom surface of each stylus holder clamp 21 has a pair of V-grooves 32 cut therein which receive strip inserts 33 also made of sintered metal carbide as above described. These inserts are located on the underside of the stylus holder clamp where the latter contacts or rides upon the grouping bars 26. Also, the inserts 33 are angularly disposed with respect to the line of travel of the belt so that each insert 33 will extend throughout the full width of the sintered metal carbide contacting surface of the grouping bar.

The inserts 33 are preferably formed of a sintered metal carbide rod which, for example, has a diameter on the order of .040 inch. Each section of rod is silver soldered in its respective groove 32 and its upper surface is parallel with the under surface of stylus holder clamp 21. It should be particularly noted that the inserts 33 are not even with the surface of the stylus holder clamp but rather extend above the surface a small distance as clearly seen in Fig. 10. The distance that each insert 33 extends above the surface of the clamp may be on the order of .005 to .008 inch.

It is seen then that with the stylus belt in place on the pulleys 11 and 12, the pin 25' of each stylus holder will ride in the track provided by the ribs 17 of the belt table. The undersurface of each stylus holder clamp 21 will ride on the upper edges of the grouping bars 26 in such a manner that the inserts 33 will be in contact with the inserts and inserts 28, 30 or 31 in the upper edges of the associated grouping bars. As each stylus holder rides off the belt table assembly and onto a pulley 11 or 12, the pin 25 will mesh with a hole 34 formed in each pulley. It is understood that the circumference of each pulley is equal to the linear distance between adjacent stylus holders so that each stylus holder will meet the hole 34 as the holder contacts a pulley.

It is preferred that the base portion 16 be made of nonmagnetic metal or other material. The base portion and ribs 17 may be formed of nonmagnetic, nonconductive material such as hard plastic. Thus a magnetic circuit may be established from each magnet through the bars 26, and magnetic stylus holder plates 19, 21. The pairs of slidably contacting metal carbide bearing elements will space the stylus holder plates from the bars 26 while insuring uniformity of the force of magnetic attraction between the stylus holders and the bars 26 as the stylus holders slide thereover.

In Fig. 3 a portion of a sheet of electrographic recording paper 14 is shown in operating contact with a stylus 23. The means for guiding and supporting the paper and retaining it in position is shown as plates 42 and 43 on opposite sides of the paper. These plates are paper supporting portions of a platen including a vane 44, hinged at a remote point not shown in the drawing and spring pressed against the paper. A marking circuit 47 has one wire 46 electrically contacting paper 14 and another wire 45 connected to one of the bars 26. Thus electrical marking voltages can be applied across the paper. Direct electrical continuity exists between the stylus 23 and the marking circuit 47 through the plates 19 and 21 of the stylus holder at least one insert 33, at least one insert 28, a bar 26, and wire 45. By connecting another wire 49 from the other bar 26 to wire 45, two parallel electrical paths are provided between the stylus holder and the marking circuit via two pairs of inserts 28, 33.

The invention thus provides means for maintaining direct electrical continuity between a stylus and a marking circuit, by employing sintered metal carbide elements as electrically conductive elements. At the same time the substantially nonmagnetic elements serve as spacers to maintain uniformity of the magnetic field holding the stylus holders down on the rails with uniform constant contact. The carbide elements further serve as hard, wear-resistant bearing means for withstanding repeated sliding contacts over very long periods of time.

Although the present invention has been described with respect to a specific embodiment thereof, it is understood that this is only intended as exemplary of the invention and is not to be considered as limiting the invention which is defined in the appended claims.

What is claimed is:

1. A facsimile apparatus, comprising a pair of spaced pulleys, a continuous nonconductive flexible belt entrained on said pulleys and driven thereby, a plurality of electrically conductive, magnetic stylus holders secured by clamps to said belt, a pin secured to and depending from each stylus holder, track means located under a run of said belt, said track means including a table having a pair of nonmagnetic ribs forming a channel, a magnetic metal side plate secured to each side of said table and defining two rails, a plurality of uniformly spaced magnets located within said table to urge said stylus holders toward the rails, a substantially nonmagnetic, electrically conductive, hard, wear-resistant bearing element made of sintered metal carbide located in the upper edge of each rail, a plurality of substantially nonmagnetic electrically conductive hard bearing elements made of sintered metal carbide located in an under surface of each stylus holder clamp and extending from said under surface to space said clamp from the rails, the bearing elements in said rails slidably contacting the bearing elements in said stylus holder clamps, said depending pin being received in said channel and contacting said ribs as the stylus holders travel over said track means to prevent lateral movement of said belt, whereby two direct parallel electrical paths are provided between each stylus and said rails via two pairs of slidably contacting bearing elements, while said stylus holders are held by uniformly applied magnetic forces on said plates during their entire travel over said rails.

2. A facsimile apparatus, comprising a continuous, nonconductive belt, means for driving said belt in the direction of its length, a plurality of magnetic, electrically conductive stylus holders secured to said belt, a pair of magnetic, electrically conductive rails located under a run of said belt, magnetic means maintaining a magnetic circuit through said rails and stylus holders, a sintered metal carbide element secured to each rail and extending the length of said run, and a pair of sintered metal carbide elements secured to each stylus holder and sliding in continuous contact with the metal carbide elements respectively secured to said rails, the contacting elements spacing said stylus holders from said rails to maintain gaps in said circuit between the rails and stylus holders while maintaining direct parallel electrical paths between said stylus holders and rails, nonmagnetic means defining a channel between said rails, and guide members secured to said stylus holders and projecting into said channel to prevent lateral movement of said belt during said run.

References Cited in the file of this patent

UNITED STATES PATENTS

| | | |
|---|---|---|
| 2,715,055 | Fryklund | Aug. 9, 1955 |
| 2,733,118 | Stamper | Jan. 31, 1956 |
| 2,766,097 | Zabriskie | Oct. 9, 1956 |
| 2,770,517 | Zabriskie | Nov. 13, 1956 |